(12) United States Patent
Li et al.

(10) Patent No.: US 11,249,697 B2
(45) Date of Patent: Feb. 15, 2022

(54) PRINTING SYSTEM AND PRINTING METHOD

(71) Applicants: Chenglan Li, Shanghai (CN); Takeshi Shikama, Kanagawa (JP); Hao Zhang, Shanghai (CN); Zhenwei Shi, Shanghai (CN)

(72) Inventors: Chenglan Li, Shanghai (CN); Takeshi Shikama, Kanagawa (JP); Hao Zhang, Shanghai (CN); Zhenwei Shi, Shanghai (CN)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/201,017

(22) Filed: Mar. 15, 2021

(65) Prior Publication Data

US 2021/0286565 A1  Sep. 16, 2021

(30) Foreign Application Priority Data

Mar. 16, 2020 (CN) .......................... 202010180801.6

(51) Int. Cl.
*G06F 15/00* (2006.01)
*G06F 3/12* (2006.01)
*G06K 1/00* (2006.01)
*G06K 15/10* (2006.01)
*G06K 15/02* (2006.01)

(52) U.S. Cl.
CPC .......... *G06F 3/1205* (2013.01); *G06F 3/1243* (2013.01); *G06F 3/1253* (2013.01); *G06F 3/1292* (2013.01); *G06K 15/102* (2013.01); *G06K 15/1876* (2013.01)

(58) Field of Classification Search
CPC .... G06F 3/1205; G06F 3/1243; G06F 3/1253; G06F 3/1292; G06K 15/102; G06K 15/1876
USPC ............................. 358/1.13, 1.15, 1.14, 1.1
See application file for complete search history.

(56) References Cited

U.S. PATENT DOCUMENTS

| | | | |
|---|---|---|---|
| 2017/0280000 A1* | 9/2017 | Sukenori | .................. H04N 1/23 |
| 2018/0178557 A1* | 6/2018 | Nakazawa | ............. B41J 11/008 |
| 2020/0241822 A1 | 7/2020 | Shikama et al. | |
| 2020/0244821 A1 | 7/2020 | Tanaka et al. | |
| 2021/0001643 A1* | 1/2021 | Nakanishi | .................. B41J 3/46 |

* cited by examiner

*Primary Examiner* — Douglas Q Tran
(74) *Attorney, Agent, or Firm* — IPUSA, PLLC

(57) ABSTRACT

A printing system and a printing method are provided. The user terminal includes a print content processing unit and a sliding print content conversion unit, and the handheld printer includes an inkjet printing unit that performs inkjet printing at a predetermined inkjet width in a sliding direction when performing sliding print. The print content processing unit determines the number of sliding print motions and sequentially generates bitmaps corresponding to the respective sliding print motions based on the respective print content mode and the inkjet width, and generates bitmap format instructions corresponding to the respective bitmaps. The sliding print content conversion unit converts pixels in the bitmaps into binary data to form sliding print content. The handheld printer sequentially prints the respective sliding print content based on the respective bitmap format instructions and the print content mode.

18 Claims, 7 Drawing Sheets

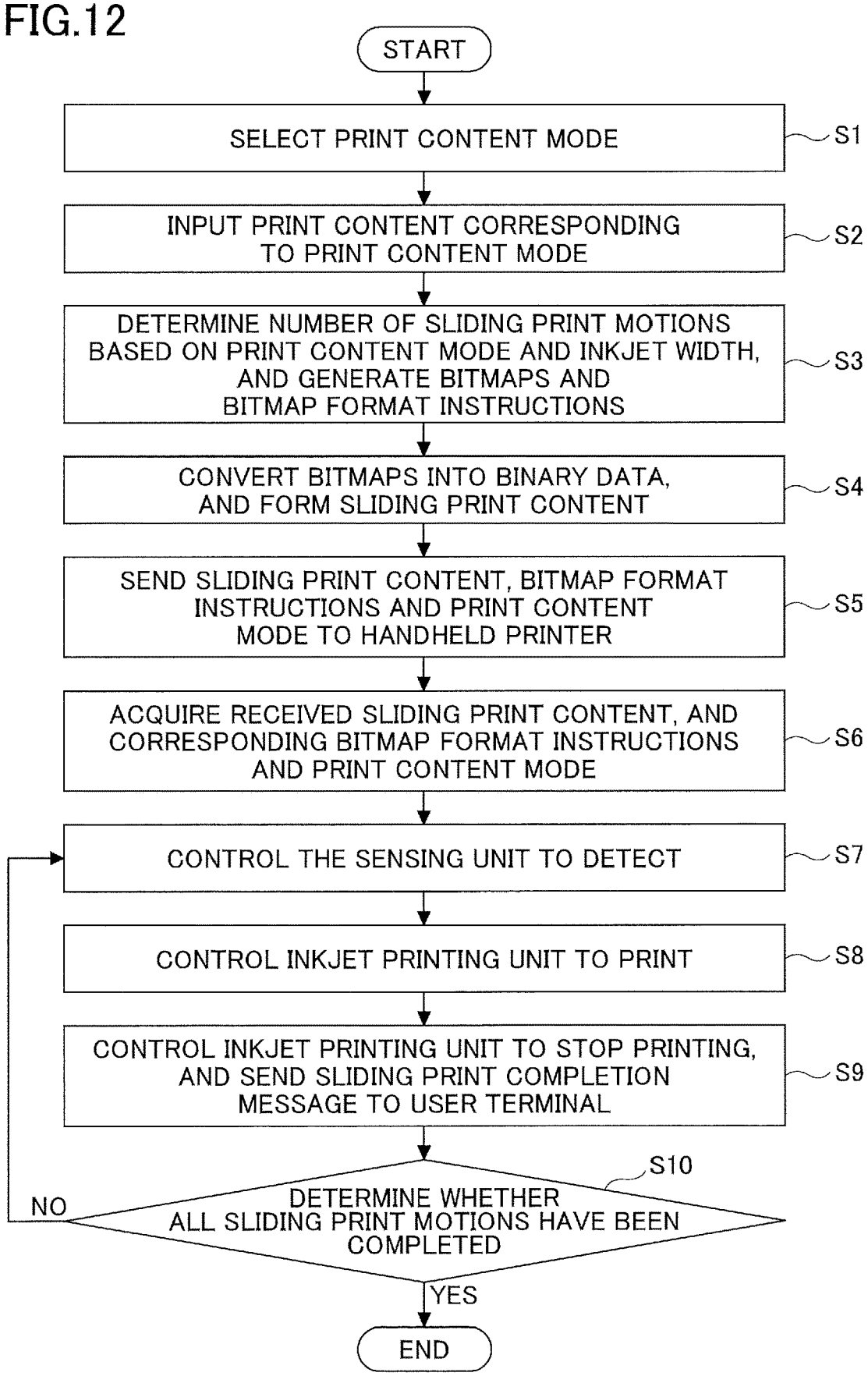

PRINTING SYSTEM AND PRINTING METHOD

CROSS-REFERENCE TO RELATED APPLICATIONS

The present application claims priority under 35 U.S.C. § 119 to Chinese Application No. 202010180801.6 filed on Mar. 16, 2020, the entire contents of which are incorporated herein by reference.

BACKGROUND OF THE INVENTION

1. Field of the Invention

The present invention relates to the field of printing services, and specifically, a printing system and a printing method.

2. Description of the Related Art

When a user uses a printer, it is generally necessary to install a corresponding printer driver in advance so that the printer can be used for printing. For different types of operating systems, it is necessary to install respective printer drivers for different models of printers. However, it may cause inconvenience in user operation. Furthermore, it is necessary for enterprises to develop respective printer drivers. Thus, the development cost of printer drivers are high, and respective maintenance cost for printer drivers are necessary.

Recently, in order to meet the needs of portable office and other needs, handheld printers that can be carried by users are provided. The handheld printer allows users to print on any print medium by sliding with their hands. This type of handheld printer can also use a driver to convert the print content input by the user into data that can be recognized by the handheld printer and print the print content.

However, most portable handheld printers use smart phones as terminals. However, it is very difficult to develop printer drivers for smart phones. Furthermore, it is necessary for enterprises to re-develop these new types of handheld printers on other platforms, and development cost of the printer drivers of the handheld printers are very high. Even though printer drivers have been developed, it is necessary for users to install the printer driver after uploading a file and use the driver to set the printing parameters again, which is very inconvenient.

SUMMARY OF THE INVENTION

According to an aspect of the present invention, a printing system is provided. The printing system includes a user terminal operated by a user; and a handheld printer configured to perform sliding print on a print medium by having the user perform one or more sliding print motions, and communicate with the user terminal. The user terminal includes a screen storage unit, an input display unit, a print content processing unit, a sliding print content conversion unit, and a user-side communication unit. The handheld printer includes an inkjet printing unit, and the inkjet printing unit performs inkjet printing at a predetermined inkjet width in one or more sliding directions when performing the sliding print. The screen storage unit stores a print content mode selection screen and a print content input screen. The input display unit displays the print content mode selection screen such that the user selects a print content mode from among a plurality of print content modes formed by respective types of print content, and displays the print content input screen such that the user inputs the respective print content. The print content processing unit determines the number of the sliding print motions and sequentially generates one or more bitmaps corresponding to the respective sliding print motions based on the respective print content mode and the inkjet width, and generates one or more bitmap format instructions corresponding to the respective bitmaps based on an input format of the print content, in response to the user confirming the input print content. The sliding print content conversion unit converts pixels in the bitmaps into binary data, and forms sliding print content corresponding to the respective sliding print motions. The user-side communication unit sends the sliding print content, and the respective bitmap format instructions and the print content mode to the handheld printer. The handheld printer sequentially prints the respective sliding print content based on the respective bitmap format instructions and the print content mode, when the user performs the respective sliding print motions on the print medium while holding the handheld printer.

According to another aspect of the present invention, a printing method is provided. The printing method is executed in a printing system that includes a user terminal operated by a user, and a handheld printer configured to perform sliding print on a print medium by having the user perform one or more sliding print motions, and communicate with the user terminal. The user terminal includes a screen storage unit, an input display unit, a print content processing unit, a sliding print content conversion unit, and a user-side communication unit. The handheld printer includes an inkjet printing unit, and the inkjet printing unit performs inkjet printing at a predetermined inkjet width in one or more sliding directions when performing the sliding print. The screen storage unit stores a print content mode selection screen and a print content input screen. The printing method includes displaying, by the input display unit, the print content mode selection screen such that the user selects a print content mode from among a plurality of print content modes formed by respective types of print content, and displaying the print content input screen such that the user inputs the respective print content; determining, by the print content processing unit, the number of the sliding print motions and sequentially generating one or more bitmaps corresponding to the respective sliding print motions based on the respective print content mode and the inkjet width, and generating one or more bitmap format instructions corresponding to the respective bitmaps based on an input format of the print content, in response to the user confirming the input print content; converting, by the sliding print content conversion unit, pixels in the bitmaps into binary data, and forming sliding print content corresponding to the respective sliding print motions; sending, by the user-side communication unit, the sliding print content, and the respective bitmap format instructions and the print content mode to the handheld printer; and sequentially printing, by the handheld printer, the respective sliding print content based on the respective bitmap format instructions and the print content mode, when the user performs the respective sliding print motions on the print medium while holding the handheld printer.

BRIEF DESCRIPTION OF THE DRAWINGS

FIG. 12 is a flowchart of a printing method according to another embodiment of the present invention.

DESCRIPTION OF THE EMBODIMENTS

Figure 1:
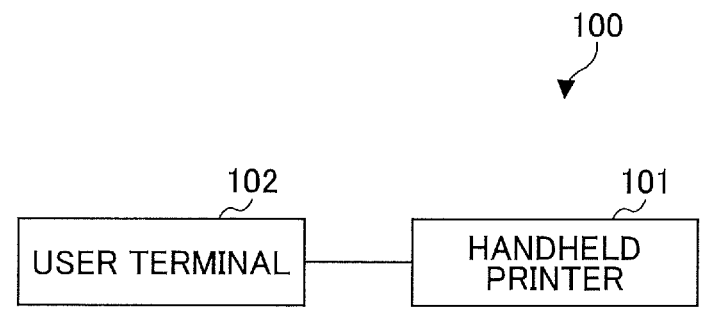
FIG. 1 is a structural block diagram of a printing system according to an embodiment of the present invention.

In the following, specific embodiments of the present invention will be described in detail with reference to the accompanying drawings.

In view of the problem of the conventional technology, an object of the embodiments of the present invention is to provide a printing system and a printing method that can directly convert print content input by a user into data that can be recognized by a handheld printer, and can send the data to the handheld printer, so that the user performs sliding print.

In a first embodiment, a printing system is provided. The printing system includes a user terminal operated by a user; and a handheld printer configured to perform sliding print on a print medium by having the user perform one or more sliding print motions, and communicate with the user terminal. The user terminal includes a screen storage unit, an input display unit, a print content processing unit, a sliding print content conversion unit, and a user-side communication unit. The handheld printer includes an inkjet printing unit, and the inkjet printing unit performs inkjet printing at a predetermined inkjet width in one or more sliding directions when performing the sliding print. The screen storage unit stores a print content mode selection screen and a print content input screen. The input display unit displays the print content mode selection screen such that the user selects a print content mode from among a plurality of print content modes formed by respective types of print content, and displays the print content input screen such that the user inputs the respective print content. The print content processing unit determines the number of the sliding print motions and sequentially generates one or more bitmaps corresponding to the respective sliding print motions based on the respective print content mode and the inkjet width, and generates one or more bitmap format instructions corresponding to the respective bitmaps based on an input format of the print content, if the input print content is confirmed by the user. The sliding print content conversion unit converts pixels in the bitmaps into binary data, and forms sliding print content corresponding to the respective sliding print motions. The user-side communication unit sends the sliding print content, and the respective bitmap format instructions and the print content mode to the handheld printer. The handheld printer sequentially prints the respective sliding print content based on the respective bitmap format instructions and the print content mode, when the user performs the respective sliding print motions on the print medium while holding the handheld printer.

In the first embodiment, the user terminal may further include a color support information acquisition unit. The color support information acquisition unit sends a color acquisition request to the handheld printer to acquire color support information that indicates whether the handheld printer supports color printing. The sliding print content conversion unit includes a color support determining unit, a color data generating unit, a bitmap color determining unit, and a monochrome data generating unit. The color support determining unit determines whether the handheld printer supports color printing, based on the color support information. The color data generating unit converts pixels in the bitmaps into respective CMYK data as the binary data, if the color support determining unit determines that the handheld printer supports color printing. The bitmap color determining unit determines whether the bitmap is a monochrome image, if the color support determining unit determines that the handheld printer does not support color printing. The monochrome data generating unit converts pixels in the bitmaps into respective 8 bpp monochrome data as the binary data, if the bitmap is a monochrome image. The monochrome data generating unit performs grayscale conversion on the bitmaps, and converts, using a dithering algorithm, pixels in the bitmaps after the grayscale conversion into respective 8 bpp monochrome data as the binary data, if the bitmap is not a monochrome image.

In the first embodiment, the user terminal may further include a prompt image generating unit. The screen storage unit further stores a printing prompt screen. The prompt image generating unit generates a prompt image prompting at least one of a printing order of the bitmaps and the sliding directions, based on the bitmaps, and the respective bitmap format instructions and the print content mode, if the user-side communication unit sends the sliding print content, and the respective bitmap format instructions and the print content mode to the handheld printer. The input display unit displays the printing prompt screen and the prompt image such that the user confirms the prompt image.

In the first embodiment, the handheld printer may further include a printer-side communication unit. The printer-side communication unit sends a sliding print completion message corresponding to the currently printed sliding print content to the user terminal, if the current sliding print motion is completed. The prompt image generating unit generates a new prompt image by highlighting the bitmap corresponding to the currently printed sliding print content in the prompt image based on the sliding print completion message, so that the input display unit displays the new prompt image in the printing prompt screen, if the user terminal receives the sliding print completion message.

In the first embodiment, the handheld printer may further include an acquisition control unit and a sensing unit. The bitmap format instruction includes processing sequence information corresponding to the bitmap. The acquisition control unit acquires the respective bitmap format instructions and the print content mode, and controls the sensing unit to detect whether the handheld printer is pressed onto the print medium by the user while sliding on the print medium, if the handheld printer receives the sliding print content, and the respective bitmap format instructions and the print content mode. The acquisition control unit acquires the current sliding print content based on the processing sequence information, and controls the inkjet printing unit to print the current sliding print content, if the sensing unit detects that the handheld printer is pressed onto the print medium by the user while sliding on the print medium. The acquisition control unit controls the inkjet printing unit to stop printing to have the user complete the current sliding print motion, if the sensing unit detects that the handheld printer is removed from the print medium.

In the first embodiment, the print content may be a text type. The print content input screen includes a text input region. The input display unit displays the print content input screen and the text input region, such that the user inputs text information, and sets a font format whose font size does not exceed the inkjet width as the print content, if the user selects the print content mode corresponding to the text type. The print content processing unit determines the number of the sliding print motions based on the number of lines of the text information, and sequentially generates the respective bitmaps based on texts of respective lines in the text information, when determining the number of the sliding print motions and sequentially generating the bitmaps corresponding to the respective sliding print motions based on the respective print content mode and the inkjet width.

In the first embodiment, the user terminal may include a graphic code image generating unit. The print content may be a graphic code type. The print content input screen includes a graphic code input confirmation region. The input display unit displays the print content input screen and the graphic code input confirmation region, such that the user inputs text information to be converted to a graphic code, if the user selects the print content mode corresponding to the graphic code type. The graphic code image generating unit generates a graphic code image containing the print content whose size does not exceed the inkjet width, if the user confirms the input print content. The input display unit displays the graphic code image in the graphic code input confirmation region such that the user confirms the graphic code image, and sets the graphic code image confirmed by the user as the print content.

In the first embodiment, the print content may be an image type. The print content input screen includes an image input region. The input display unit displays the print content input screen and the image input region such that the user inputs an image as the print content, if the user selects the print content mode corresponding to the image type. The print content processing unit includes an image size calculation unit, an image division unit, and a bitmap generation unit. The image size calculation unit calculates an image size of the image. The image division unit divides the image based on the image size and the inkjet width to obtain a plurality of division images whose length does not exceed the inkjet width, and sets the number of the division images as the number of the sliding print motions. The bitmap generating unit sequentially generates the respective bitmaps based on the division images.

In the first embodiment, the print content may be a template type. The print content input screen includes a template input region, and the template input region includes a plurality of content input sections whose input type is predetermined. The input display unit displays the print content input screen and the template input region such that the user inputs the respective types of print content using the content input sections, if the user selects the print content mode corresponding to the template type.

Furthermore, in a second embodiment, a printing method is provided. The printing method is performed by a printing system. The printing system includes a user terminal operated by a user, and a handheld printer configured to perform sliding print on a print medium by having the user perform one or more sliding print motions, and communicate with the user terminal. The user terminal includes a screen storage unit, an input display unit, a print content processing unit, a sliding print content conversion unit, and a user-side communication unit. The handheld printer includes an inkjet printing unit, and the inkjet printing unit performs inkjet printing at a predetermined inkjet width in one or more sliding directions when performing the sliding print. The screen storage unit stores a print content mode selection screen and a print content input screen. The printing method includes displaying, by the input display unit, the print content mode selection screen such that the user selects a print content mode from among a plurality of print content modes formed by respective types of print content, and displaying the print content input screen such that the user inputs the respective print content; determining, by the print content processing unit, the number of the sliding print motions and sequentially generating one or more bitmaps corresponding to the respective sliding print motions based on the respective print content mode and the inkjet width, and generating one or more bitmap format instructions corresponding to the respective bitmaps based on an input format of the print content, if the input print content is confirmed by the user; converting, by the sliding print content conversion unit, pixels in the bitmaps into binary data, and forming sliding print content corresponding to the respective sliding print motions; sending, by the user-side communication unit, the sliding print content, and the respective bitmap format instructions and the print content mode to the handheld printer; and sequentially printing, by the handheld printer, the respective sliding print content based on the respective bitmap format instructions and the print content mode, when the user performs the respective sliding print motions on the print medium while holding the handheld printer.

In the printing system and the printing method, the user terminal includes the print content processing unit and the sliding print content conversion unit. The print content processing unit determines the number of sliding print motions, and sequentially generates one or more bitmaps and bitmap format instructions corresponding to the respective sliding print motions, after the user inputs and confirms print content corresponding to a print content mode. The sliding print content conversion unit converts the bitmaps into sliding print content corresponding to the respective sliding print motions. Then, the user terminal sends the sliding print content to a handheld printer so that the handheld printer performs sliding print. Thus, the printing system can directly convert print content input by a user into information that can be recognized by the handheld printer, and can send the data to the handheld printer so that the handheld printer performs sliding print. It is unnecessary for users to install a printer driver when using the handheld printer, thereby facilitating the use of the handheld printer. Meanwhile, it is unnecessary for enterprises to develop printer drivers for the handheld printer on various system platforms, thereby greatly reducing enterprise development costs.

EMBODIMENTS

FIG. 1 is a structural block diagram of a printing system according to an embodiment of the present invention.

As shown in FIG. 1, the printing system 100 includes a handheld printer 101 and a user terminal 102.

Here, the handheld printer 101 is a portable printer carried by the user. The user can perform sliding print at different places on a print medium, thereby conveniently printing the print content to be printed at any position of the print medium. The print medium may be paper, wall, desktop, cloth surface, and the like. The user terminal 102 is a computer, a smart phone, and the like operated by the user, and the computer and smart phone have its own system platforms, such as Windows, iOS, Android, and the like.

In the present embodiment, the handheld printer 101 may directly perform bidirectional communication with the user terminal 102 by Bluetooth, a wireless network, or a USB data cable without installing a printer driver. When the connection between the handheld printer 101 and the user terminal 102 is initially established, the user terminal 102 obtains device identification information of the handheld printer 101 based on a corresponding communication protocol, and establishes bidirectional data communication with the handheld printer 101 if it is determined that the device identification information meets a predetermined determination condition. The bidirectional data communication allows the user terminal 102 to send data to the handheld printer 101, query status, or set parameters, and allows the handheld printer 101 to actively feedback status information (such as printing status, battery power, and the like) to the user terminal 102.

In particular, when the handheld printer 101 and the user terminal 102 are communicably connected via a USB data line, the general system platform sets the access type of the handheld printer 101 to Usbprint.sys by default. In this case, USB bidirectional communication (USB Control transmission) cannot be performed between the user terminal 102 and the handheld printer 101. Accordingly, in the present embodiment, the user terminal 102 may switch the access type of the handheld printer 101 to WinUSB (the switch may be performed by OpenSource (liwdi)), if it is determined that the device identification information of the handheld printer 101 meets the predetermined determination conditions. In this way, it is capable of establishing the above bidirectional data communication via a USB data line.

In the present embodiment, as the above predetermined determination condition, for example, it may be determined whether the device identification information is the identification information of the corresponding handheld printer. In this way, it is capable of ensuring that the connected object is the handheld printer. The determination condition may also be set and adjusted according to actual needs. For example, it may be determined whether the device identification information corresponds to a certain type of handheld printer.

Figure 2:
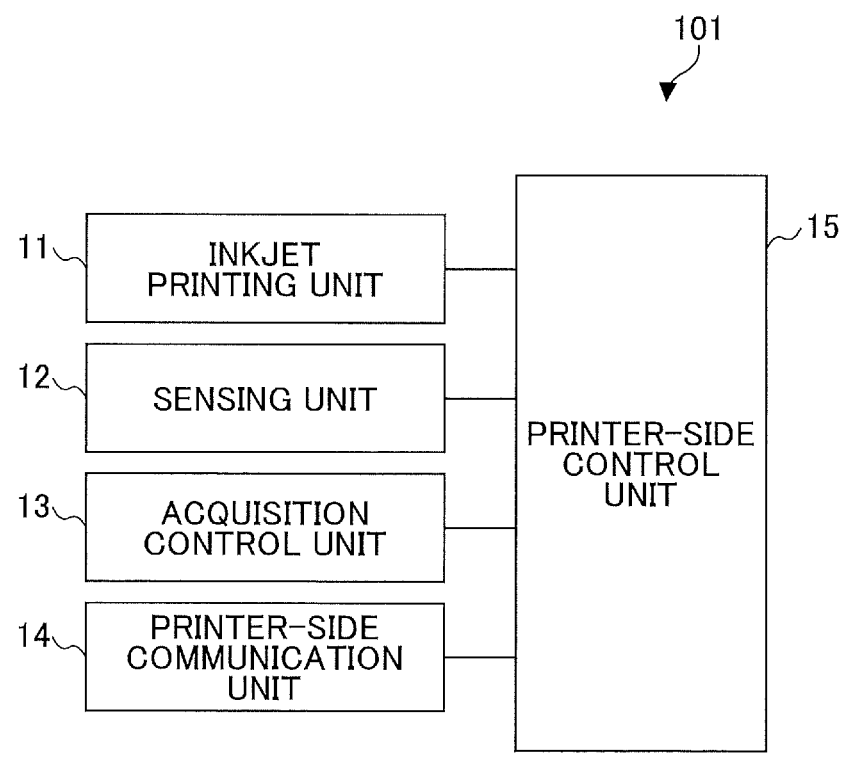
FIG. 2 is a structural block diagram of a handheld printer according to the embodiment of the present invention.

FIG. 2 is a structural block diagram of a handheld printer according to the embodiment of the present invention.

As shown in FIG. 2, the handheld printer 101 includes an inkjet printing unit 11, a sensing unit 12, an acquisition control unit 13, a printer-side communication unit 14, and a printer-side control unit 15.

Here, the printer-side communication unit performs data communication between the handheld printer 101 or the various components of the handheld printer 101 and the user terminal 102. The printer-side control unit 15 stores a computer program for controlling operations of each component of the handheld printer 101.

The inkjet printing unit performs inkjet printing at a predetermined inkjet width in one or more sliding directions when performing the sliding print.

Figure 3:
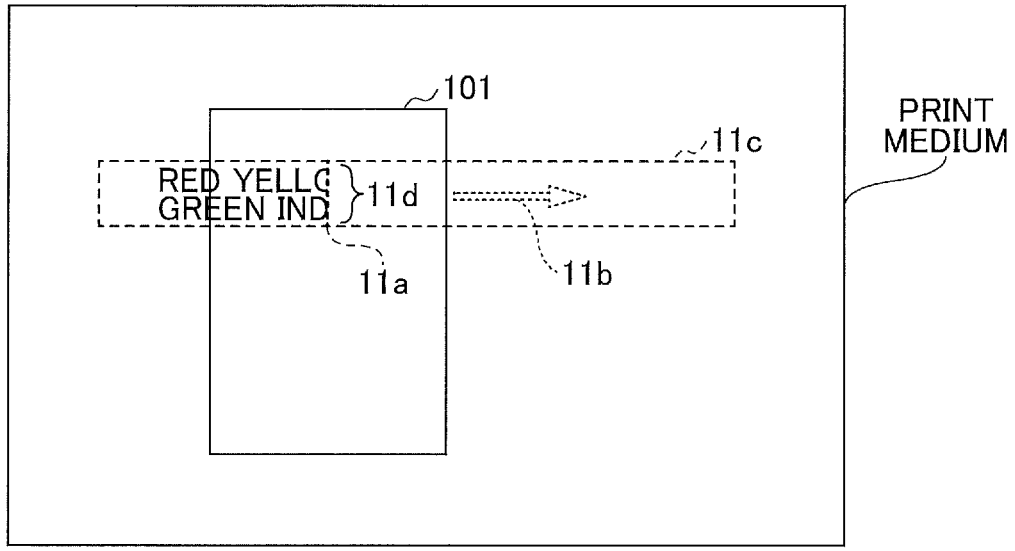
FIG. 3 is a schematic diagram of printing using the handheld printer according to the embodiment of the present invention.

In the present embodiment, the inkjet printing unit 11 includes an inkjet array 11a formed by a plurality of inkjet heads arranged on the handheld printer 101. As shown in FIG. 3, the inkjet array 11a ejects ink under the control of the acquisition control unit 13 thereby printing on the print medium, when the user presses a surface of the handheld printer 101, on which the inkjet printing unit 11 is provided, on the print medium while sliding the handheld printer 101 on a printing region 11c in the sliding direction 11b (the printed text is "red yellow blue green indigo blue purple"). Here, the length 11d of the inkjet array 11a is the maximum allowable inkjet width during inkjet printing.

The sensing unit 12 detects whether the surface of the handheld printer 101 on which the inkjet printing unit 11 is provided is pressed onto the print medium by the user.

Furthermore, in the present embodiment, the sensing unit 12 may also detect a sliding distance as the user slides the handheld printer 101 on the printing medium while performing the sliding print.

The acquisition control unit 13 acquires the bitmap format instructions, the print content mode, and the sliding print content, and controls the inkjet printing unit 11 and the sensing unit 12 to perform printing processing based on the read data, when the printer-side communication unit 14 receives the sliding print content, the corresponding bitmap format instructions, and print content mode sent by the user terminal 102.

In the present embodiment, the bitmap format instruction includes at least a start-end instruction, and processing sequence information corresponding to the bitmap. The print content mode includes at least the sliding direction of the sliding print motion. The acquisition control unit first acquires the bitmap format instruction and the print content mode, and controls the sensing unit 12 based on the start-end instruction to detect whether the handheld printer 101 is pressed onto the print medium by the user while sliding on the print medium.

Furthermore, the acquisition control unit 13 acquires the current sliding print content based on the processing sequence information in the bitmap format instruction, and controls the inkjet printing unit 11 to print the current sliding print content based on the sliding direction in the print content mode, if the sensing unit 12 detects that the handheld printer 101 is pressed onto the print medium by the user while sliding on the print medium. Furthermore, the acquisition control unit 13 controls the inkjet printing unit 11 to stop printing to have the user complete the current sliding print motion, if the sensing unit 12 detects that the handheld printer 101 is removed from the print medium.

In the present embodiment, regardless of whether the inkjet printing unit 11 has completed the current sliding print content, once the sensing unit detects that the handheld printer 101 is removed from the print medium, the acquisition control unit 13 will control the inkjet printing unit 11 to stop printing, and confirm that the current sliding print has been completed.

At the same time, the acquisition control unit 13 controls the printer-side communication unit to send a sliding print completion message corresponding to the current sliding print content to the user terminal 102, if the current sliding print motion is completed.

In addition, in the present embodiment, when the user slides the handheld printer 101, the acquisition control unit 13 controls the inkjet printing unit 11 in real time based on the sliding distance detected by the sensing unit 12 and the width of the inkjet array 11a, thereby enabling the user to perform inkjet printing during the sliding process.

Figure 4:
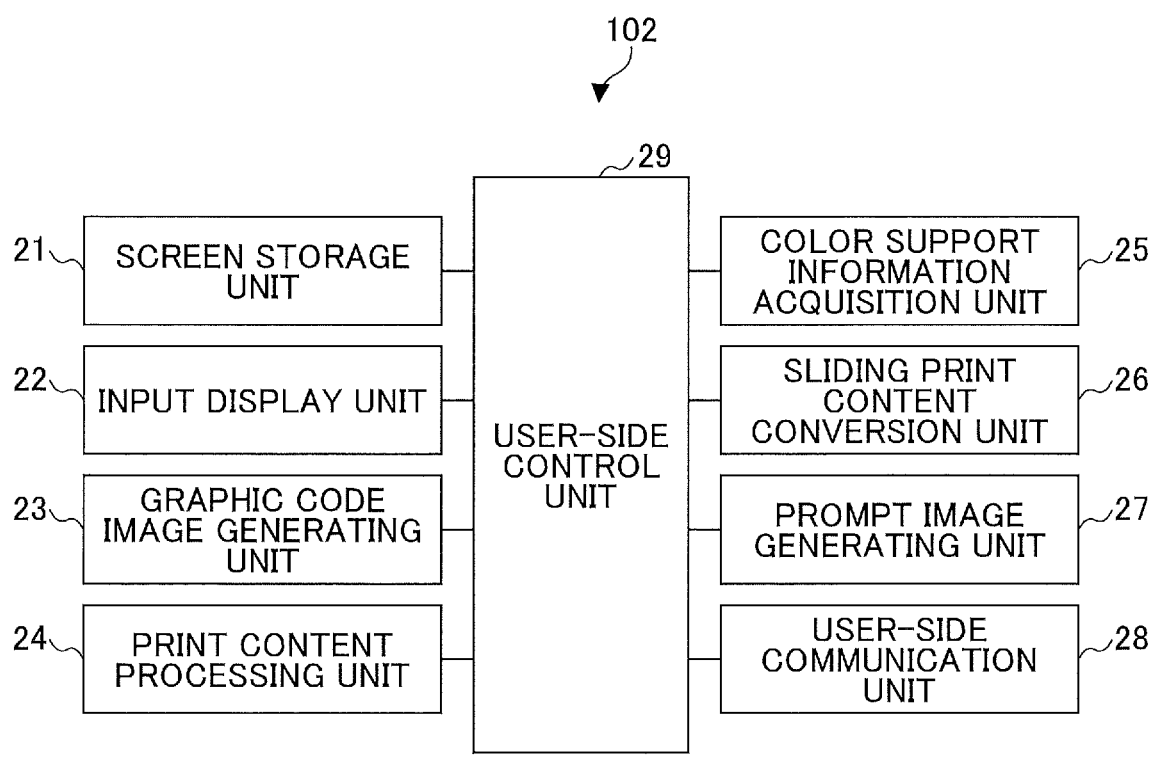
FIG. 4 is a structural block diagram of a user terminal according to the embodiment of the present invention.

FIG. 4 is a structural block diagram of a user terminal according to the embodiment of the present invention.

As shown in FIG. 4, the user terminal 102 includes a screen storage unit 21, an input display unit 22, a graphic code image generating unit 23, a print content processing unit 24, a color support information acquisition unit 25, a sliding print content conversion unit 26, a prompt image generating unit 27, a user-side communication unit 28, and a user-side control unit 29.

Here, the user-side communication unit 28 performs data interaction between the user terminal 102 or the various components of the user terminal 102 and the handheld printer 101. The user-side control unit 29 stores a computer program for controlling the operation of the components of the user terminal 102.

The screen storage unit 21 stores a print content mode selection screen, a print content input screen, and a printing prompt screen.

In the print content mode selection screen, a plurality of print content modes formed by respective types of print content are displayed, so that the user selects a print content mode from among the plurality of print content modes.

In the present embodiment, the print content may be a text type, a graphic code type, an image type, and a template type.

Here, the print content of the text type is plain text. The print content of the graphic code type is a graphic code such as a barcode or a matrix barcode (a two-dimensional barcode). The print content of the image type is an image, and the image may further include rasterized characters or graphics. The print content of the template type is the print content whose input type and input format are predetermined, and may be predetermined based on templates with fixed a format such as postcards, delivery vouchers, envelopes and the like. Icons corresponding to various types are displayed in the print content mode selection screen, so that the user selects the corresponding print content mode.

In addition, in the present embodiment, the print content mode further includes a sliding mode corresponding to the sliding direction and a repetition mode for multiple printing. The user may select the desired sliding mode while selecting the print content mode to determine the sliding direction when performing sliding print using the handheld printer, and select the repetition mode and input the number of repetitions to print the input print content multiple times repeatedly.

The print content input screen is displayed after the user selects the print content mode, so that the user inputs the print content corresponding to the print content mode. The print content input screen includes a text input region 21*a*, a graphic code input confirmation region 21*b*, an image input region 21*c*, and a template input region 21*d*.

In the present embodiment, the corresponding region is directly displayed in the print content input screen based on the user's selection, so that the user inputs the corresponding print content.

In a case where the user selects the print content mode corresponding to the text type, the text input region 21*a* is displayed in the print content input screen, so that the user inputs text information and sets a font format as the print content.

Figure 5:
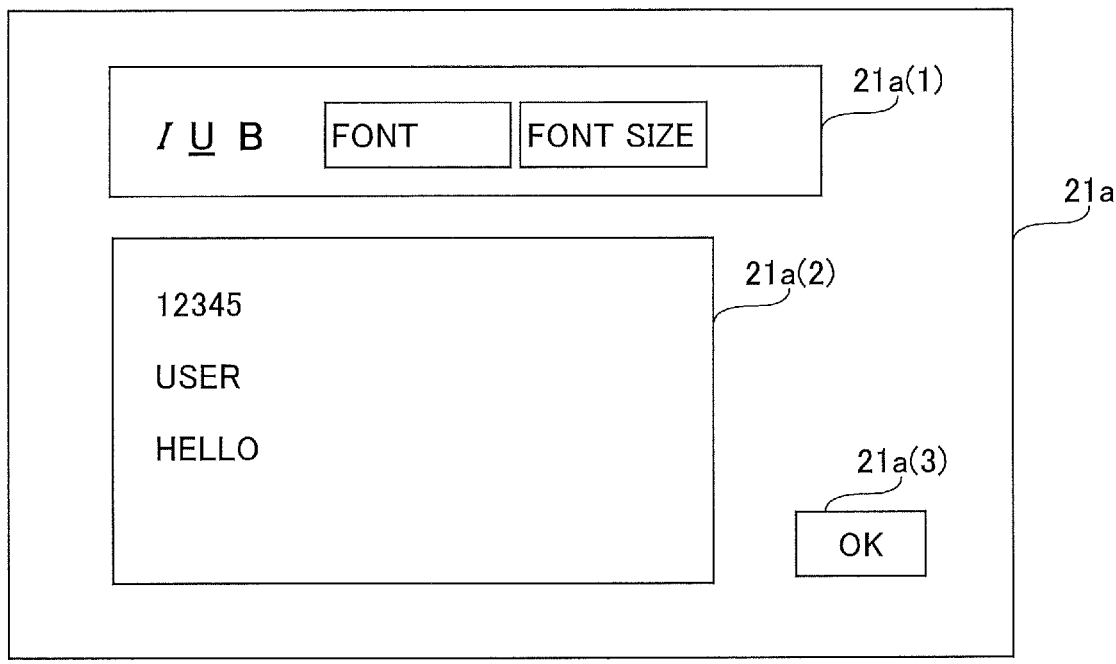
FIG. 5 is a schematic diagram of a text input region according to the embodiment of the present invention.

In the present embodiment, as shown in FIG. 5, the text input region 21*a* includes a text input section 21*a*(2), a format setting section 21*a*(1), and an input confirmation button 21*a*(3). Here, the user inputs text information in the text input section 21*a*(2). The user sets a font format of the text, such as a font, a font size, and a font style (e.g., bold or italic) in the format setting section 21*a*(1). The font size in the font format is limited within a range that does not exceed the inkjet width. The user confirms the input print content using the input confirmation button 21*a*(3).

In a case where the user selects the print content mode corresponding to the graphic code type, the graphic code input confirmation region 21*b* is displayed in the print content input screen, so that the user inputs the graphic code as the print content.

Figure 6:
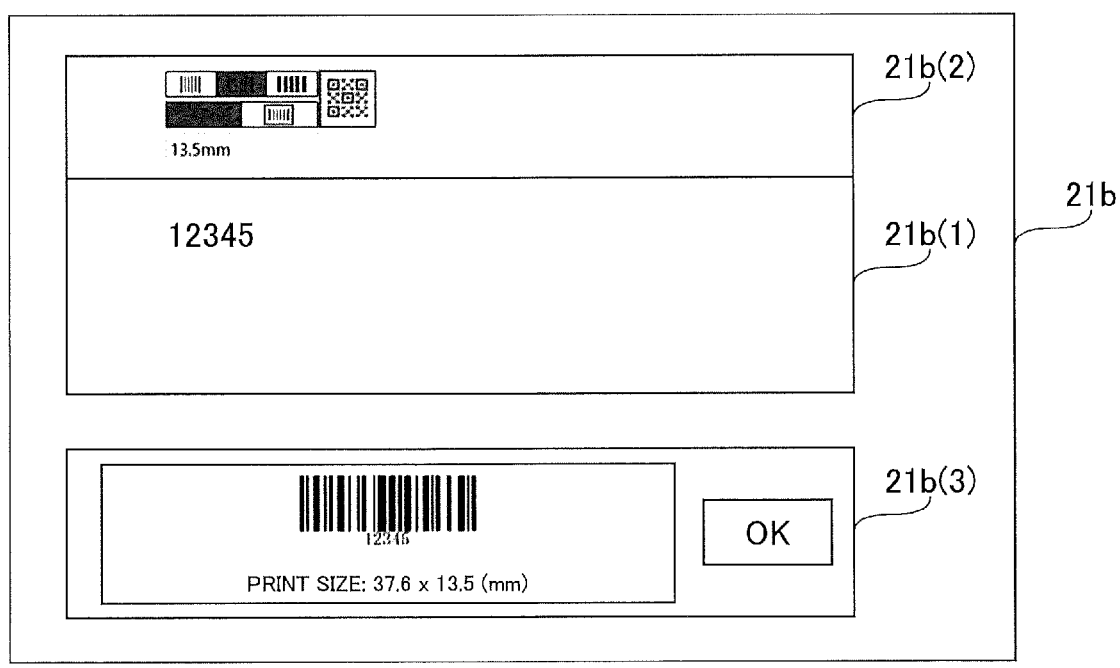
FIG. 6 is a schematic diagram of a graphic code input confirmation region according to the embodiment of the present invention.

In the present embodiment, as shown in FIG. 6, the graphic code input confirmation region 21*b* includes a text input section 21*b*(1), a format setting section 21*b*(2), and a graphic code confirmation section 21*b*(3). Here, the user inputs text information to be converted into a graphic code in the text input section 21*b*(1). The user select a desired graphic code format, such as a barcode, a style for setting the barcode or the like, in the format setting section 21*b*(2). The user confirms a graphic code generated by the graphic code image generating unit 23 in the graphic code confirmation section 21*b*(3). For example, once the user confirms the graphic code by clicking a confirmation button, the graphic code is set as the print content input by the user.

In a case where the user selects the print content mode corresponding to the image type, the image input region 21*c* is displayed in the print content input screen, so that the user inputs an image as the print content.

Figure 7:
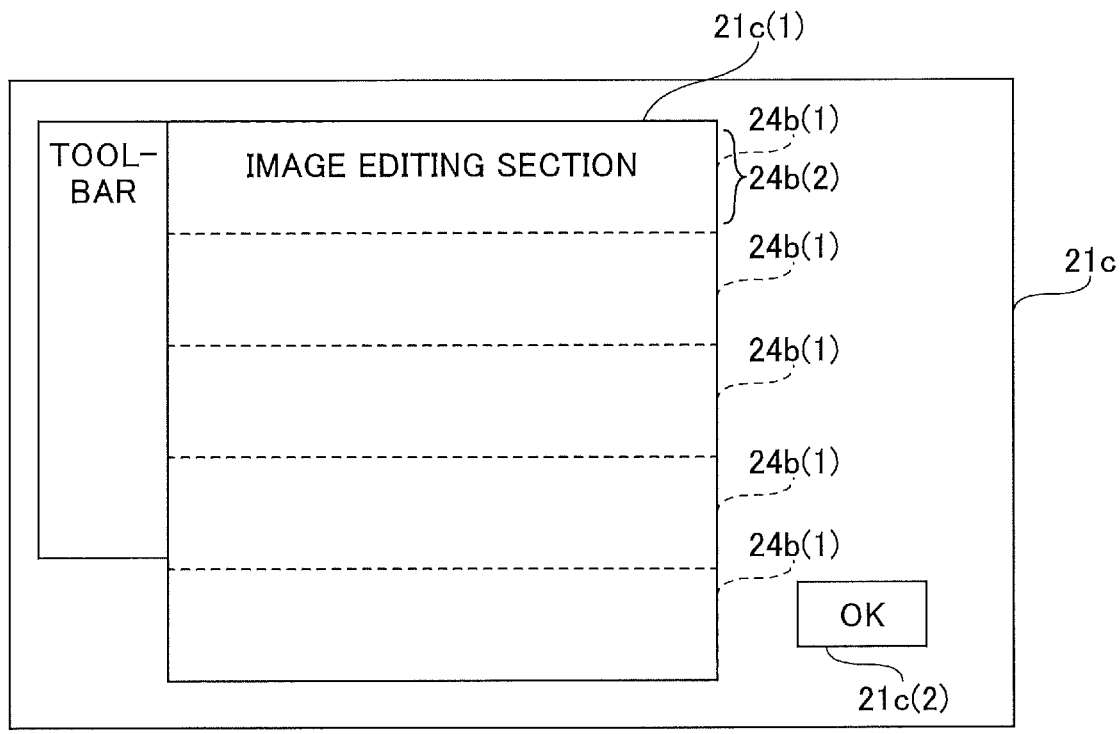
FIG. 7 is a schematic diagram of an image input region according to the embodiment of the present invention.

In the present embodiment, as shown in FIG. 7, the image input region 21*c* includes an image editing section 21*c*(1) and an editing confirmation button 21*c*(2). The user imports one or more images, characters or graphics and perform editing operations in the image editing section 21*c*(1). Finally, after the user clicks the edit confirmation button 21*c*(2) to confirm the editing, all the contents in the image editing section 21*c*(1) are rasterized and merged to form an image as the print content.

In a case where the user selects the print content mode corresponding to the template type, the template input region 21*d* is displayed in the print content input screen, so that the user input information in a plurality of corresponding content input section in the template input region 21*d* whose input type (such as a text type, a graphic code type or an image type) and input format (such as sequence information, specification style, and the like) are predetermined.

Figure 8:
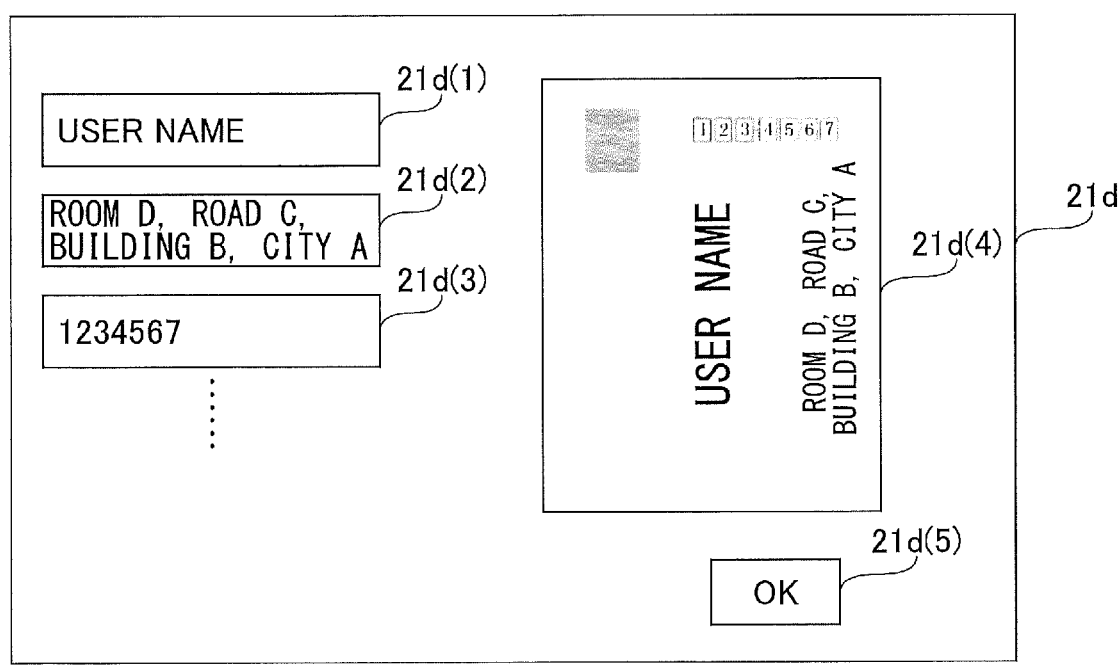
FIG. 8 is a schematic diagram of a template input region according to the embodiment of the present invention.

In the present embodiment, taking a postcard as an example, as shown in FIG. 8, the template input region 21*d* includes a name input section 21*d*(1), an address input section 21*d*(2), a postal code input section 21*d*(3), a template display section 21*d*(4), and an input confirmation button 21*d*(5). Here, the name input section 21*d*(1), the address input section 21*d*(2) and the postal code input section 21*d*(3) are respectively preset with appropriate font formats such as fonts, font sizes, font styles (e.g., bold or italic) and the like, at corresponding positions in the postcard based on the of a name, an address, and a postal code, and the respective input types are preset as text type. Furthermore, a final display effect is displayed in the template display section 21*d*(4), so that the user can intuitively confirm the effect of the template and facilitate direct inputting of corresponding information and printing. After the user clicks the input confirmation button 21*d*(5) to confirm the input content, the content input in the name input section 21*d*(1), the address input section 21*d*(2) and the postal code input section 21*d*(3) is set as the print content.

After the prompt image generating unit 27 generates a prompt image, the prompt image is displayed in the printing prompt screen, so that the user performs a corresponding sliding print motion based on the prompt image.

Figure 9:
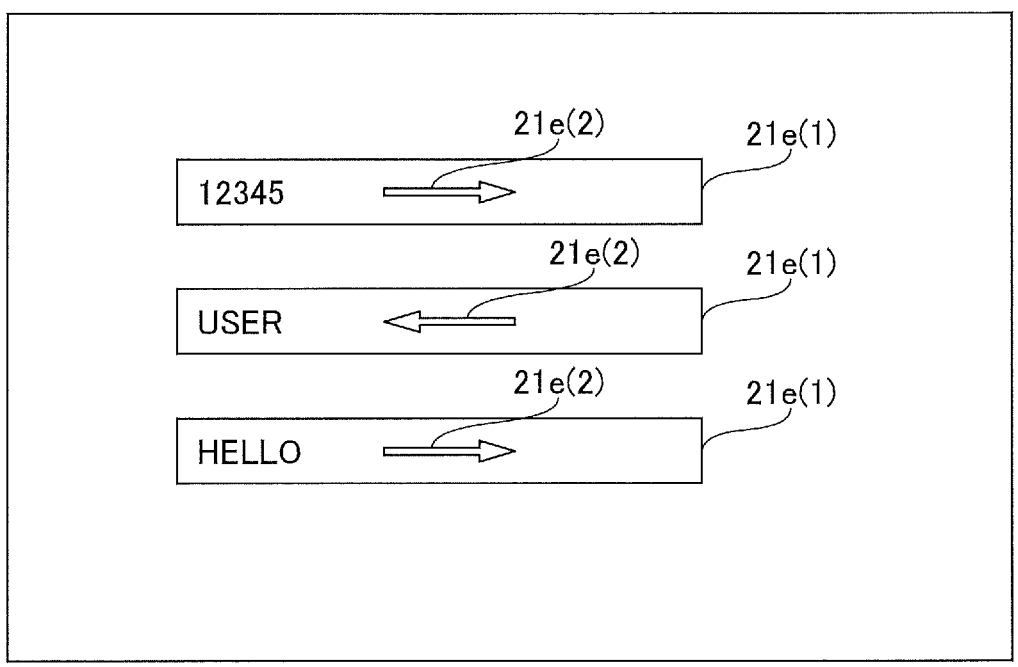
FIG. 9 is a schematic diagram of a prompt image according to the embodiment of the present invention.

In the present embodiment, as shown in FIG. 9, taking the text type print content input in FIG. 5 as an example, print content 21e(1) input by the user and the set sliding directions 21e(2) by the user are displayed in the prompt image. Furthermore, when receiving a sliding print completion message sent by the handheld printer 101, the prompt image generating unit 27 updates the prompt image. For example, the prompt image generating unit 27 highlights the print content to be printed or being printed, and displays the sliding directions 21e(2) of the print content by an arrow prompt, so that the user confirms the print content appropriately.

The input display unit 22 displays the above screens, so that the user performs the corresponding human-computer interaction via the screens.

The graphic code image generating unit 23 generates corresponding graphic codes based on the text content and graphic code format input by the user. In the present embodiment, the graphic code is a barcode, a matrix barcode, or the like. The graphic code image generating unit 23 generates the graphic code of the corresponding style using a conventional graphic code generation standard.

The print content processing unit 24 may determine the number of the sliding print motions and sequentially the bitmaps corresponding to the respective sliding print motions based on the respective print content mode and the inkjet width, and generates the bitmap format instructions corresponding to the respective bitmaps based on the input format of the print content.

Figure 10:
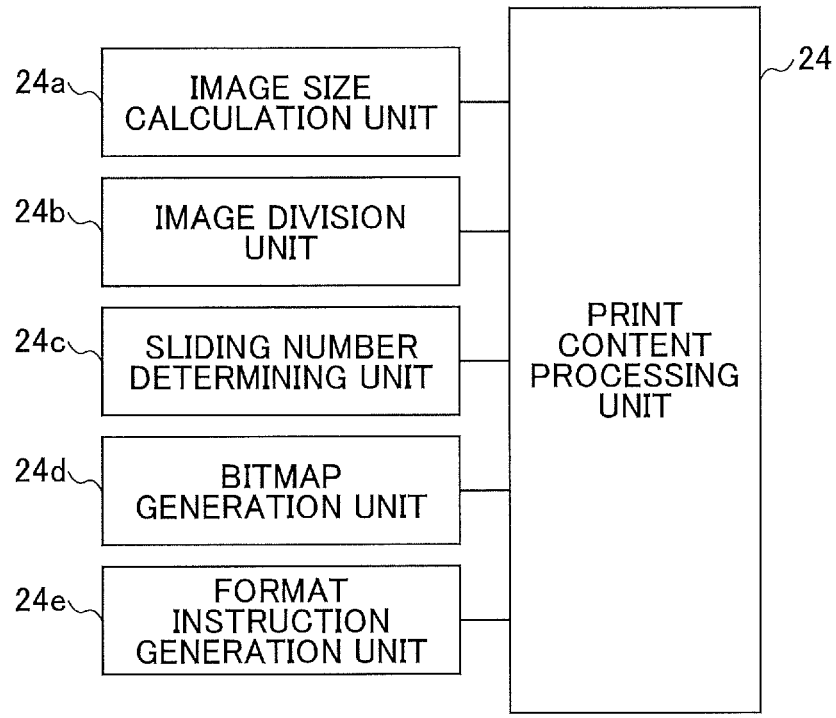
FIG. 10 is a structural block diagram of a print content processing unit according to the embodiment of the present invention.

FIG. 10 is a structural block diagram of a print content processing unit according to the embodiment of the present invention.

As shown in FIG. 10, the print content processing unit 24 includes an image size calculation unit 24a, an image division unit 24b, a sliding number determining unit 24c, a bitmap generation unit 24d, and a format instruction generation unit 24e.

In the present embodiment, the image size calculation unit 24a and the image division unit 24b are only used to process the print content of the image type.

The image size calculation unit 24a calculates an image size of the print content of the image type.

The image division unit 24b may divide the print content of the image type based on the image size and the inkjet width to obtain a plurality of division images whose length does not exceed the inkjet width, and may set the number of the division images as the number of the sliding print motions. In the present embodiment, as shown in FIG. 7, a length 24b(2) of the division image 24b(1) does not exceed the inkjet width ejection (that is, does not exceed the length 11d of the inkjet array 11a).

The sliding number determining unit 24c determines the number of the sliding print motions. In the present embodiment, if the print content is the text type, the sliding number determining unit 24c determines the number of sliding print motions based on the number of lines of the text information (for example, the number of line feed marks). If the print content is the graphic code type, the sliding number determining unit 24c determines the number of sliding print motions based on the number of graphic codes, that is, each graphic code corresponds to one sliding print motion. If the print content is the template type, the sliding number determining unit 24c determines the number of sliding print based on the information input in respective content input sections by the user, that is, each print content input in the content input section corresponds to one sliding print motion.

The bitmap generating unit 24d sequentially generates the respective bitmaps based on the number of sliding print motions and the print content. In the present embodiment, each bitmap corresponds to one sliding print motion.

The format instruction generation unit 24e generates bitmap format instructions corresponding to the respective bitmaps based on the input format of the print content.

In the present embodiment, the bitmap format instruction includes the processing sequence information (processing order) and a start-end code of each bitmap. For example, if the print content is the text type, the processing sequence information of the bitmap corresponding to each text line is determined based on the line break marks and line order (that is, the input Format) in text information (that is, the print content).

The color support information acquisition unit 25 acquires color support information of the handheld printer 101. The color support information is used to indicate whether the color supported by the handheld printer 101 is monochrome or color.

In the present embodiment, the color support information is included in the device identification information. For example, the device identification information may be in a form of "handheld printer, monochrome" or the like. The color support information acquisition unit 25 searches the device identification information for keywords to acquires the color support information of the corresponding handheld printer 101.

The sliding print content conversion unit converts each pixel in each of the bitmaps into binary data, and forms the sliding print content corresponding to the respective sliding print motions.

Figure 11:
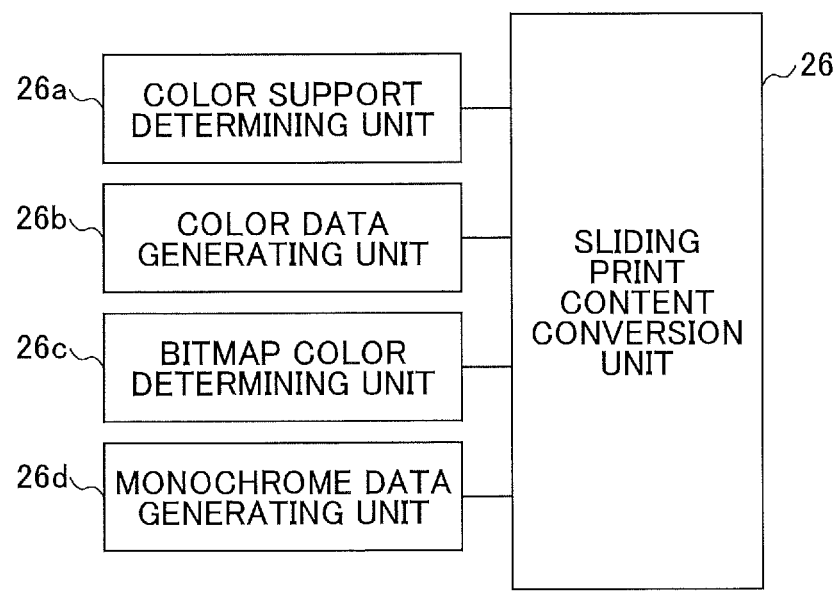
FIG. 11 is a structural block diagram of a sliding print content conversion unit according to the embodiment of the present invention.

FIG. 11 is a structural block diagram of a sliding print content conversion unit according to the embodiment of the present invention.

As shown in FIG. 11, the sliding print content conversion unit 26 includes a support color determining unit 26a, a color data generation unit 26b, a bitmap color determining unit 26c, and a monochrome data generation unit 26d.

Specifically, the color support determining unit 26a determines whether the handheld printer supports color printing based on the color support information.

If the support color determining unit 26a determines that the handheld printer supports color printing, the color data generation unit 26b converts each pixel in each of the bitmaps into corresponding CMYK data (that is, using a conventional conversion method for converting data from RGB or ARGB to CMYK) as the binary data.

If the support color determining unit 26a determines that the handheld printer does not support color printing, the bitmap color determining unit 26c determines whether the bitmap is a monochrome image.

If the bitmap is a monochrome image, the monochrome data generating unit 26d converts each pixel in the bitmaps into corresponding 8 bpp monochrome data as the binary data.

If the bitmap is not a monochrome image, the monochrome data generating unit 26d performs grayscale conversion on the bitmaps, and converts each pixel in each of the bitmaps after the grayscale conversion into respective 8 bpp monochrome data as the binary data using a dithering algorithm.

In the present embodiment, after the sliding print content conversion unit 26 performs the conversion to obtain the sliding print content, the user-side communication unit 28 sends the sliding print content, and the corresponding bitmap format instructions and the print content mode to the handheld printer 101. Here, the sliding print content is composed of binary data, and the bitmap format instructions and the print content modes adopt a PJL (Printer Job Language), which can be combined into RPCS-R data that can be directly recognized by the handheld printer 101.

The prompt image generation unit 27 generates the prompt image prompting at least one of a printing order of the bitmaps and the sliding directions, based on the bitmaps, and the corresponding bitmap format instructions and the print content mode, if the user-side communication unit 28 sends the sliding print content, and the corresponding bitmap format instructions and print content mode to the handheld printer 10. Furthermore, the prompt image generating unit 27 generates a new prompt image by highlighting the bitmap corresponding to the currently printed sliding print content in the prompt image based on the sliding print completion message, so that the input display unit 22 displays the new prompt image in the printing prompt screen, if the user-side communication unit 28 receives the sliding print completion message.

FIG. 12 is a flowchart of the operations of the printing system according to the embodiment of the present invention.

As shown in FIG. 12, when the user uses the printing system 100, the process of inputting the print content and performing the sliding print is as follows.

In step S1, the input display unit 22 displays the content mode selection screen such that the user selects a print content mode from among a plurality of print content modes. The process proceeds to step S2 after the user selects the print content mode.

In step S2, the input display unit 22 displays the print content input screen such that the user inputs the print content corresponding to the print content mode. The process proceeds to step S3 after the user confirms the input print content.

In step S3, the print content processing unit 24 determines the number of sliding print motions and sequentially generates the bitmaps corresponding to the respective sliding print motions based on the corresponding print content mode and the inkjet width, and generates the bitmap format instructions corresponding to the respective bitmaps based on the input format of the print content. Then process proceeds to step S4.

In step S4, the sliding print content conversion unit 26 converts each pixel in each bitmap into binary data, and forms the sliding print content corresponding to the respective sliding print motions. Then the process proceeds to step S5.

In step S5, the user-side communication unit 28 sends the sliding print content, and the corresponding bitmap format instructions and print content mode to the handheld printer 101. Then the process proceeds to step S6.

In step S6, the acquisition control unit 13 acquires the sliding print content, and the corresponding bitmap format instructions and print content mode received by the printer-side communication unit 14. Then the process proceeds to step S7.

In step S7, the acquisition control unit 13 controls the sensing unit 12 to detect whether the handheld printer 101 is pressed onto the print medium by the user while sliding on the print medium. If the sensing unit 12 detects that the handheld printer 101 is pressed, the process proceeds to step S8.

In step S8, the acquisition control unit 13 acquires the current sliding print content based on the processing sequence information in the bitmap format instruction, and controls the inkjet printing unit 11 to print the current sliding print content. If the sensing unit 12 detects that the handheld printer 101 is removed from the print medium, the process proceeds to step S9.

In step S9, the acquisition control unit 13 controls the inkjet printing unit 11 to stop printing to have the user complete the current sliding print motion, and controls the printer-side communication unit 14 to send a sliding print completion message to the user terminal 102. Then the process proceeds to step S10.

In step S10, the acquisition control unit determines whether all of the sliding print motions have been completed based on the bitmap format instructions. If it is determined that it has not been completed, the process proceeds to step S7, and if it is determined that it has been completed, the process is terminated.

<Effect of Embodiments>

In the printing system and the printing method according to the embodiments, the user terminal includes the print content processing unit and the sliding print content conversion unit. The print content processing unit determines, the number of sliding print motions, and sequentially generates one or more bitmaps and bitmap format instructions corresponding to the respective sliding print motions, after the user inputs and confirms print content corresponding to a print content mode. The sliding print content conversion unit converts the bitmaps into sliding print content corresponding to the respective sliding print motions. Then, the user terminal sends the sliding print content to a handheld printer so that the handheld printer performs sliding print. Thus, the printing system can directly convert print content input by a user into information that can be recognized by the handheld printer, and can send the data to the handheld printer so that the handheld printer performs sliding print. It is unnecessary for users to install a printer driver when using the handheld printer, thereby facilitating the user to print using the handheld printer. Meanwhile, it is unnecessary for enterprises to develop printer drivers for the handheld printer on various system platforms, thereby greatly reducing enterprise development costs.

In the embodiments, the sliding print content conversion unit includes the support color determining unit, the color data generation unit, the bitmap color determining unit, and the monochrome data generation unit. Thus, it is capable of determining the support colors of the handheld printer and the colors of the bitmaps respectively. Accordingly, the bitmaps are correspondingly converted into binary data that can be recognized by the printer, and the sliding print content is formed, thereby ensuring that the sliding print content can be normally recognized by the handheld printer to have the user complete the printing task.

In the embodiments, the user terminal further includes the prompt image generating unit that generates the prompt image prompting based on the bitmaps, and the respective bitmap format instructions and the print content mode. Thus, the specific content and the operations to be performed of each sliding print motion can be intuitively displayed to the user, by displaying the prompt image in the printing prompt screen. Accordingly, it is capable of avoiding the problem of printing errors due to the excessive number of sliding print motions caused by the user's subsequent print content or unclear operations.

In the embodiments, the print content includes various types, such as text type, graphic code type, image type, and template type, it is convenient for the user to select the corresponding print content mode and input the corresponding print content based on actual needs, so that the printing system allows the user to conveniently perform printing using the handheld printer appropriately.

In the embodiments, if the user terminal 102 determines that the device identification information of the handheld printer 101 meets the predetermined determination conditions, the access type of the handheld printer 101 is converted to WinUSB. Thus, it is capable of overcoming the conventional problem that a printer and a computer cannot directly perform bidirectional communication via USB in a case where no printer driver is installed. Accordingly, the handheld printer of the present invention can directly perform bidirectional data communication on various operating platforms.

The present invention is not limited to the specifically described embodiments, and various modifications, combinations and replacements may be made without departing from the scope of the present invention.

For example, in the above embodiments, only one handheld printer is included in the printing system. In another embodiment of the present invention, the user terminal may also simultaneously communicate with a plurality of handheld printers, and may display a printer selection screen at the same time. The device identification information of each handheld printer is displayed on the printer selection screen, so that the user selects one of them to perform sliding print.

As another example, in the above embodiments, the color support information is obtained by determining keywords in the device identification information. In another embodiment of the present invention, the color support information may also be obtained using the following method. The user terminal sends a device information acquisition request to the handheld printer after the handheld printer and the user terminal establish a communication connection, thereby directly acquiring the color support information and other related equipment information of the handheld printer.

In the above embodiments, the types of the print content are the text type, the graphic code type, the image type, and the template type. In another embodiment of the present invention, the print content may also be of other types, for example, a table type, which a table is imported and the number of sliding print motions is determined based on the number of rows in the table. Furthermore, for the template type, more templates may also be set based on actual needs, so that it is more convenient for users to select appropriate templates for printing.

What is claimed is:

1. A printing system comprising:
a user terminal operated by a user; and
a handheld printer configured to perform sliding print on a print medium by having the user perform one or more sliding print motions, and communicate with the user terminal,
wherein the user terminal includes a screen storage unit, an input display unit, a print content processing unit, a sliding print content conversion unit, and a user-side communication unit,
wherein the handheld printer includes an inkjet printing unit, and the inkjet printing unit performs inkjet printing at a predetermined inkjet width in one or more sliding directions when performing the sliding print,
wherein the screen storage unit stores a print content mode selection screen and a print content input screen,
wherein the input display unit displays the print content mode selection screen such that the user selects a print content mode from among a plurality of print content modes formed by respective types of print content, and displays the print content input screen such that the user inputs the respective print content,
wherein the print content processing unit determines the number of the sliding print motions and sequentially generates one or more bitmaps corresponding to the respective sliding print motions based on the respective print content mode and the inkjet width, and generates one or more bitmap format instructions corresponding to the respective bitmaps based on an input format of the print content, in response to the user confirming the input print content,
wherein the sliding print content conversion unit converts pixels in the bitmaps into binary data, and forms sliding print content corresponding to the respective sliding print motions,
wherein the user-side communication unit sends the sliding print content, and the respective bitmap format instructions and the print content mode to the handheld printer, and
wherein the handheld printer sequentially prints the respective sliding print content based on the respective bitmap format instructions and the print content mode, when the user performs the respective sliding print motions on the print medium while holding the handheld printer.

2. The printing system as claimed in claim 1,
wherein the user terminal further includes a color support information acquisition unit,
wherein the color support information acquisition unit sends a color acquisition request to the handheld printer to acquire color support information that indicates whether the handheld printer supports color printing,
wherein the sliding print content conversion unit includes a color support determining unit, a color data generating unit, a bitmap color determining unit, and a monochrome data generating unit,
wherein the color support determining unit determines whether the handheld printer supports color printing, based on the color support information,
wherein the color data generating unit converts pixels in the bitmaps into respective CMYK data as the binary data, in response to the color support determining unit determining that the handheld printer supports color printing,
wherein the bitmap color determining unit determines whether the bitmap is a monochrome image, in response to the color support determining unit determining that the handheld printer does not support color printing,
wherein if the bitmap is a monochrome image, the monochrome data generating unit converts pixels in the bitmap into respective 8 bpp monochrome data as the binary data, and
wherein if the bitmap is not a monochrome image, the monochrome data generating unit performs grayscale conversion on the bitmap, and converts, using a dithering algorithm, pixels in the bitmap after the grayscale conversion into respective 8 bpp monochrome data as the binary data.

3. The printing system as claimed in claim 1,
wherein the user terminal further includes a prompt image generating unit,
wherein the screen storage unit further stores a printing prompt screen,
wherein the prompt image generating unit generates a prompt image prompting at least one of a printing order of the bitmaps and the sliding directions, based on the bitmaps, and the respective bitmap format instructions and the print content mode, in response to the user-side communication unit sending the sliding print content, and the respective bitmap format instructions and the print content mode to the handheld printer, and wherein the input display unit displays the printing prompt screen and the prompt image such that the user confirms the prompt image.

4. The printing system as claimed in claim 3, wherein the handheld printer further includes a printer-side communication unit, wherein the printer-side communication unit sends a sliding print completion message corresponding to the currently printed sliding print content to the user terminal in response to completion of the current sliding print motion, and wherein the prompt image generating unit generates a new prompt image by highlighting the bitmap corresponding to the currently printed sliding print content in the prompt image based on the sliding print completion message, in response to receiving the sliding print completion message, so that the input display unit displays the new prompt image in the printing prompt screen.

5. The printing system as claimed in claim 1, wherein the handheld printer further includes an acquisition control unit and a sensing unit, wherein the bitmap format instruction includes processing sequence information corresponding to the bitmap, wherein the acquisition control unit acquires the respective bitmap format instructions and the print content mode, and controls the sensing unit to detect whether the handheld printer is pressed onto the print medium by the user while sliding on the print medium, in response to receiving the sliding print content, and the respective bitmap format instructions and the print content mode, wherein the acquisition control unit acquires the current sliding print content based on the processing sequence information, and controls the inkjet printing unit to print the current sliding print content, in response to the sensing unit detecting that the handheld printer is pressed onto the print medium by the user while sliding on the print medium, and wherein the acquisition control unit controls the inkjet printing unit to stop printing to complete the current sliding print motion, in response to the sensing unit detecting that the handheld printer is removed from the print medium.

6. The printing system as claimed in claim 1, wherein the print content is a text type, wherein the print content input screen includes a text input region, wherein the input display unit displays the print content input screen and the text input region, such that the user inputs text information, and sets a font format whose font size does not exceed the inkjet width as the print content, in response to the user selecting the print content mode corresponding to the text type, and wherein the print content processing unit determines the number of the sliding print motions based on the number of lines of the text information, and sequentially generates the respective bitmaps based on texts of respective lines in the text information, when determining the number of the sliding print motions and sequentially generating the bitmaps corresponding to the respective sliding print motions based on the respective print content mode and the inkjet width.

7. The printing system as claimed in claim 1, wherein the user terminal further includes a graphic code image generating unit, the print content is a graphic code type, the print content input screen includes a graphic code input confirmation region, wherein the input display unit displays the print content input screen and the graphic code input confirmation region, such that the user inputs text information to be converted to a graphic code, in response to the user selecting the print content mode corresponding to the graphic code type, wherein the graphic code image generating unit generates a graphic code image containing the print content whose size does not exceed the inkjet width, in response to the user confirming the input print content, and wherein the input display unit displays the graphic code image in the graphic code input confirmation region such that the user confirms the graphic code image, and sets the graphic code image confirmed by the user as the print content.

8. The printing system as claimed in claim 1, wherein the print content is an image type, wherein the print content input screen includes an image input region, wherein the input display unit displays the print content input screen and the image input region such that the user inputs an image as the print content, in response to the user selecting the print content mode corresponding to the image type, wherein the print content processing unit includes an image size calculation unit, an image division unit, and a bitmap generation unit, wherein the image size calculation unit calculates an image size of the image, wherein the image division unit divides the image based on the image size and the inkjet width to obtain a plurality of division images whose length does not exceed the inkjet width, and sets the number of the division images as the number of the sliding print motions, and wherein the bitmap generating unit sequentially generates the respective bitmaps based on the division images.

9. The printing system as claimed in claim 1, wherein the print content is a template type, wherein the print content input screen includes a template input region, and the template input region includes a plurality of content input sections whose input type is predetermined, wherein the input display unit displays the print content input screen and the template input region such that the user inputs the respective types of print content using the content input sections, in response to the user selecting the print content mode corresponding to the template type.

10. A printing method executed in a printing system that includes a user terminal operated by a user, and a handheld printer configured to perform sliding print on a print medium by having the user perform one or more sliding print motions, and communicate with the user terminal, wherein the user terminal includes a screen storage unit, an input display unit, a print content processing unit, a sliding print content conversion unit, and a user-side communication unit, wherein the handheld printer includes an inkjet printing unit, and the inkjet printing unit performs inkjet printing at a predetermined inkjet width in one or more sliding directions when performing the sliding print, wherein the screen storage unit stores a print content mode selection screen and a print content input screen, and wherein the printing method comprises
displaying, by the input display unit, the print content mode selection screen such that the user selects a print content mode from among a plurality of print content modes formed by respective types of print content, and displaying the print content input screen such that the user inputs the respective print content;
determining, by the print content processing unit, the number of the sliding print motions and sequentially generating one or more bitmaps corresponding to the respective sliding print motions based on the respective print content mode and the inkjet width, and generating one or more bitmap format instructions corresponding to the respective bitmaps based on an input format of the print content, in response to the user confirming the input print content;
converting, by the sliding print content conversion unit, pixels in the bitmaps into binary data, and forming sliding print content corresponding to the respective sliding print motions;
sending, by the user-side communication unit, the sliding print content, and the respective bitmap format instructions and the print content mode to the handheld printer; and
sequentially printing, by the handheld printer, the respective sliding print content based on the respective bitmap format instructions and the print content mode, when the user performs the respective sliding print motions on the print medium while holding the handheld printer.

11. The printing method as claimed in claim 10,
wherein the user terminal further includes a color support information acquisition unit,
wherein the color support information acquisition unit sends a color acquisition request to the handheld printer to acquire color support information that indicates whether the handheld printer supports color printing,
wherein the sliding print content conversion unit includes a color support determining unit, a color data generating unit, a bitmap color determining unit, and a monochrome data generating unit, and
wherein the printing method further comprises
determining, by the color support determining unit, whether the handheld printer supports color printing, based on the color support information;
converting, by the color data generating unit, pixels in the bitmaps into respective CMYK data as the binary data, in response to the color support determining unit determining that the handheld printer supports color printing;
determining, by the bitmap color determining unit, whether the bitmap is a monochrome image, in response to the color support determining unit determining that the handheld printer does not support color printing;
if the bitmap is a monochrome image, converting, by the monochrome data generating unit, pixels in the bitmaps into respective 8 bpp monochrome data as the binary data; and if the bitmap is not a monochrome image, performing, by the monochrome data generating unit, grayscale conversion on the bitmaps, and converting, using a dithering algorithm, pixels in the bitmaps after the grayscale conversion into respective 8 bpp monochrome data as the binary data.

12. The printing method as claimed in claim 10,
wherein the user terminal further includes a prompt image generating unit,
wherein the screen storage unit further stores a printing prompt screen, and
wherein the printing method further comprises
generating, by the prompt image generating unit, a prompt image prompting at least one of a printing order of the bitmaps and the sliding directions, based on the bitmaps, and the respective bitmap format instructions and the print content mode, in response to the user-side communication unit sending the sliding print content, and the respective bitmap format instructions and the print content mode to the handheld printer; and
displaying, by the input display unit, the printing prompt screen and the prompt image such that the user confirms the prompt image.

13. The printing method as claimed in claim 12,
wherein the handheld printer further includes a printer-side communication unit, and
wherein the printing method further comprises
sending, by the printer-side communication unit, a sliding print completion message corresponding to the currently printed sliding print content to the user terminal, in response to completion of the current sliding print motion; and
generating, by the prompt image generating unit, a new prompt image by highlighting the bitmap corresponding to the currently printed sliding print content in the prompt image based on the sliding print completion message, so that the input display unit displays the new prompt image in the printing prompt screen, in response to receiving the sliding print completion message.

14. The printing method as claimed in claim 10,
wherein the handheld printer further includes an acquisition control unit and a sensing unit,
wherein the bitmap format instruction includes processing sequence information corresponding to the bitmap, and
wherein the printing method further comprises
acquiring, by the acquisition control unit, the respective bitmap format instructions and the print content mode, and controlling the sensing unit to detect whether the handheld printer is pressed onto the print medium by the user while sliding on the print medium, in response to receiving the sliding print content, and the respective bitmap format instructions and the print content mode;
acquiring, by the acquisition control unit, the current sliding print content based on the processing sequence information, and controlling the inkjet printing unit to print the current sliding print content, in response to the sensing unit detecting that the handheld printer is pressed onto the print medium by the user while sliding on the print medium; and
controlling, by the acquisition control unit, the inkjet printing unit to stop printing to have the user complete the current sliding print motion, in response to the sensing unit detecting that the handheld printer is removed from the print medium.

15. The printing method as claimed in claim 10, wherein the print content is a text type, wherein the print content input screen includes a text input region, and wherein the printing method comprises displaying, by the input display unit, the print content input screen and the text input region, such that the user inputs text information, and sets a font format whose font size does not exceed the inkjet width as the print content, in response to the user selecting the print content mode corresponding to the text type; and determining, by the print content processing unit, the number of the sliding print motions based on the number of lines of the text information, and sequentially generating the respective bitmaps based on texts of respective lines in the text information.

16. The printing method as claimed in claim 10, wherein the user terminal includes a graphic code image generating unit, the print content is a graphic code type, the print content input screen includes a graphic code input confirmation region, and wherein the printing method comprises displaying, by the input display unit, the print content input screen and the graphic code input confirmation region, such that the user inputs text information to be converted to a graphic code, in response to the user selecting the print content mode corresponding to the graphic code type;

generating, by the graphic code image generating unit, a graphic code image containing the print content whose size does not exceed the inkjet width, in response to the user confirming the input print content; and displaying, by the input display unit, the graphic code image in the graphic code input confirmation region such that the user confirms the graphic code image, and setting the graphic code image confirmed by the user as the print content.

17. The printing method as claimed in claim 10, wherein the print content is an image type, wherein the print content input screen includes an image input region, wherein the print content processing unit includes an image size calculation unit, an image division unit, and a bitmap generation unit, and wherein the printing method comprises displaying, by the input display unit, the print content input screen and the image input region such that the user inputs an image as the print content, in response to the user selecting the print content mode corresponding to the image type;

calculating, by the image size calculation unit, an image size of the image;

dividing, by the image division unit, the image based on the image size and the inkjet width to obtain a plurality of division images whose length does not exceed the inkjet width, and setting the number of the division images as the number of the sliding print motions; and sequentially generating, by the bitmap generating unit, the respective bitmaps based on the division images.

18. The printing method as claimed in claim 10, wherein the print content is a template type, wherein the print content input screen includes a template input region, and the template input region includes a plurality of content input sections whose input type is predetermined, and wherein the printing method comprises displaying, by the input display unit, the print content input screen and the template input region such that the user inputs the respective types of print content using the content input sections, in response to the user selecting the print content mode corresponding to the template type.

* * * * *